United States Patent
Ivanir et al.

(10) Patent No.: US 7,153,140 B2
(45) Date of Patent: Dec. 26, 2006

(54) TRAINING SYSTEM AND METHOD FOR IMPROVING USER KNOWLEDGE AND SKILLS

(75) Inventors: Dror Ivanir, Tel Aviv (IL); Asif Stoffman, Kefar-Y ona (IL); Alona Berman, Raanana (IL); Tamir Gafni, Herzlia (IL)

(73) Assignee: Prep4 Ltd, Herzilia (IL)

( * ) Notice: Subject to any disclaimer, the term of this patent is extended or adjusted under 35 U.S.C. 154(b) by 0 days.

(21) Appl. No.: 10/250,666

(22) PCT Filed: Jan. 6, 2002

(86) PCT No.: PCT/IL02/00010

§ 371 (c)(1),
(2), (4) Date: Jul. 7, 2003

(87) PCT Pub. No.: WO02/056279

PCT Pub. Date: Jul. 18, 2002

(65) Prior Publication Data

US 2004/0063085 A1    Apr. 1, 2004

Related U.S. Application Data

(60) Provisional application No. 60/260,588, filed on Jan. 9, 2001.

(51) Int. Cl.
*G09B 11/00* (2006.01)

(52) U.S. Cl. ...................... 434/322; 434/118; 434/350; 434/362

(58) Field of Classification Search ................ 434/118, 434/219, 236–238, 322, 323, 350, 362, 365, 434/218, 234, 353; 706/11, 46; 705/11; 709/219; 702/183
See application file for complete search history.

(56) References Cited

U.S. PATENT DOCUMENTS 4,867,685 A * 9/1989 Brush et al. ................ 434/234
5,241,621 A * 8/1993 Smart .......................... 706/46

(Continued)

*Primary Examiner*—Joe H. Cheng

(57) ABSTRACT

A method for creating training systems including analyzing/mapping course requirements for evaluating required knowledge/skills according to mapped subjects and defining possible failure causes, wherein each failure cause represents knowledge/skill weakness relating a certain subject or general weakness, defining knowledge/skills target level correct/wrong answers in each subject as function of the number of users, preparing a question pool, wherein each question relates to a subject knowledge/skill and/or failure cause, preparing correct and wrong answers for each question, wherein each wrong answer is related to a specific sub-subject/subject and/or to a failure cause, defining an evaluation module for assessing user knowledge/skills level based on user's success in giving correct answers in comparison to predefined target levels and type of failure causes related to the user's wrong answers, and defining exercise module for selecting sequence of questions from predefined question set based on evaluations of user knowledge/skills level and detected failure causes.

8 Claims, 8 Drawing Sheets

U.S. PATENT DOCUMENTS

| | | | |
|---|---|---|---|
| 5,306,154 A * | 4/1994 | Ujita et al. | 434/218 |
| 5,749,736 A * | 5/1998 | Griswold et al. | 434/322 |
| 5,779,486 A * | 7/1998 | Ho et al. | 434/353 |
| 5,788,504 A * | 8/1998 | Rice et al. | 434/219 |
| 5,885,087 A * | 3/1999 | Thomas | 434/323 |
| 5,957,699 A * | 9/1999 | Peterson et al. | 434/350 |
| 5,987,443 A * | 11/1999 | Nichols et al. | 706/11 |
| 6,024,577 A * | 2/2000 | Wadahama et al. | 434/322 |
| 6,146,148 A * | 11/2000 | Stuppy | 434/322 |
| 6,162,060 A * | 12/2000 | Richard et al. | 434/118 |
| 6,301,462 B1 * | 10/2001 | Freeman et al. | 434/350 |
| 6,302,698 B1 * | 10/2001 | Ziv-El | 434/323 |
| 6,315,572 B1 * | 11/2001 | Owens et al. | 434/322 |
| 6,461,166 B1 * | 10/2002 | Berman | 434/323 |
| 6,464,505 B1 * | 10/2002 | Pocock | 434/219 |
| 6,540,520 B1 * | 4/2003 | Johnson et al. | 434/322 |
| 6,587,668 B1 * | 7/2003 | Miller et al. | 434/350 |
| 6,622,003 B1 * | 9/2003 | Denious et al. | 434/350 |
| 6,626,679 B1 * | 9/2003 | Skeans et al. | 434/322 |
| 6,688,889 B1 * | 2/2004 | Wallace et al. | 434/322 |
| 6,743,024 B1 * | 6/2004 | Ivler et al. | 434/322 |
| 6,778,807 B1 * | 8/2004 | Martino et al. | 434/362 |
| 6,993,456 B1 * | 1/2006 | Brooks et al. | 702/183 |
| 2001/0042004 A1 * | 11/2001 | Taub | 705/11 |
| 2003/0049592 A1 * | 3/2003 | Park | 434/322 |
| 2003/0148253 A1 * | 8/2003 | Sacco et al. | 434/322 |
| 2003/0177203 A1 * | 9/2003 | Crook | 709/219 |

* cited by examiner

TRAINING SYSTEM AND METHOD FOR IMPROVING USER KNOWLEDGE AND SKILLS

CROSS-REFERENCE TO RELATED APPLICATIONS

This application is a U.S. National Phase Application under 35 U.S.C. 371 of PCT International Application No. PCT/IL02/00010, which has an international filing date of Jan. 6, 2002, and which claims priority from U.S. Provisional Patent Application No. 60/260,588, filed Jan. 9, 2001.

The present invention relates in general to e-learning systems. More particularly, the present invention relates to an e-learning model that allows individual tailoring of a self-learning computerized course for any given subject matter.

BACKGROUND OF THE INVENTION

Known study methods make use of written materials, relying on a user's discipline and drive to keep them working. Conventional review courses provide potential examinees with workbooks, which provide several hundred practice questions that the user can work through, as he/she prefers. At the end of these workbooks appear answers and explanations for the questions.

A major problem with these traditional approaches is that they do not, and cannot, force the user to study in a consistent, systematic and effective way. As a result, the effectiveness of studying changes from one user to another, or even the same user in different times, according to their mood, desire and drive. The danger with these conventional approaches is that the users tend not to develop a consistent problem-solving approach, but instead develop and utilize inefficient and undesirable study habits. Another disadvantage is that users also tend not to fully understand a question, and the reasons why one answer choice is correct, while the other answer choices are incorrect.

Existing systems and methods for work force planning and occupational re-adjustment have traditionally concentrated mainly on the manual analysis of an individual's skills, with little or no emphasis on a related job analysis or needs analysis of potential employers. Additionally, the current state of the art methods fails to link training resources and new training requirements as part of an overall approach.

There have already been proposed a certain solution in attempt to overcome these deficiencies. U.S. Pat. No. 6,157,808 disclose to an integrated system that enables developing training material, career paths or to determine an employee's qualifications, performance and comprehensive support for job and task analysis.

Another solution have been proposed by U.S. Pat. No. 5,885,087 providing a computerized learning approach that enables a user to improve their performance on multiple-choice exams. The invention forces examinees to practice their examination skills and subject matter knowledge in a systematic way.

Prior art methods, provided by a small number of tutorials, rely purely on statistical evaluation (the number of correct vs. incorrect responses). These tutorials do not, and cannot, provide any analysis regarding the reasoning behind incorrect responses, nor do they provide any kind of individually tailored program that adapts and re-adapts itself to the specialized needs of each student.

The present invention discloses a new concept for e-learning systems, which differentiate from prior art systems in the following aspects;

1. Prior art systems have no set of goals distinguishing between the student's current level and the level which is required to achieve these goals.
2. Prior art systems do not attempt to understand, diagnose and self-improve upon the reasoning behind a student's mistakes.
3. Prior art systems do not map possible reasons for each mistake, and then use a layered approach of analyzing all errors in order to formulate a diagnostic conclusion.
4. Prior art systems do not perform an on-going analysis of a student's progress throughout the learning process, identifying gaps in knowledge and skill, and then continuously updating the course level accordingly.
5. Prior art systems do not present exercises and exams on a dynamic basis, according to specific student needs diagnosed by the system.
6. Prior art systems do not rely on techniques of building a list of questions and answers, for indicating a student's weaknesses.
7. Prior art systems do not utilize the amount of time a student spent to answer a question, in order to reach conclusions on the reason why it took that amount of time to respond.
8. Prior art systems do not use hint requests to draw conclusions regarding the reasons for requesting a hint
9. Prior art systems do not match the lesson contents or the number and type of exercises with a pre-determined time frame.
10. Prior art systems do not adapt their tutorial program according to a student's likelihood of improvement in specific areas.
11. Prior art systems do not evaluate cognitive preferences in order to tailor the teaching aids used for each student.
12. Prior art systems do not save all student responses throughout the learning process, the amount of time he/she spend to complete each section, his/her responses to each question and the time taken to solve each problem.
13. Prior art systems do not structure a systematic tutorial package that guides the student automatically though a course that was designed specifically for him/her.

The main object of the present invention is to provide an e-learning system enabling to minimize the gap between the student's current knowledge and the knowledge needed for passing a particular exam successfully or for succeeding at a specific job—and to provide the student with the tools needed to do this effectively and efficiently.

Another object of the present invention is to provide an in-depth analysis of each student's individual aptitude in 10's or even 100's of varying data elements and cognitive proficiencies.

The present invention main advantages and innovation are as follows:

1. The method in which the tutorial program is designed according to pre-evaluation of course requirements. This evaluation highlights everything required of the student in preparation for a particular exam or job position (knowledge, know-how, guiding principles, weaknesses, thought processes). The requirements and goals, which are determined for each student, are integrated into the interface of the course program, which reflects the algorithm on which the course is based.
2. The tutorial system according to the present invention collects data on the reasoning behind a students incorrect answers, and then performs a systematic analysis of the source of the student's difficulty with specific exam questions. Based on this analysis, the system then provides a tutorial program, which will guide the student through the correct method for selecting accurate responses.
3. A students proficiency is analyzed by looking, not only at which questions were answered correctly or incorrectly, but also at why a specific wrong answer was chosen over any other.
4. The system according to the present invention re-diagnoses a students level over and over at every stage, not only following final and mid-term exams presented throughout the course. The system accomplishes this goal by presenting students with various exercises throughout the program curriculum. In this way, the tutorial adjusts itself on an ongoing basis, according to a students current level at each stage of the course.
5. The lesson exercises presented to each student are selected on a dynamic basis from a large pool of questions, according to the students current level at any given stage and based on his/her performance up to that time. During an exercise or exam, the system is able to adapt questions, not only to the students level (as is common with certain tutorial software), but also according to the reasons for the particular students mistakes. The program organizes and presents the following questions accordingly—either within the same exercise or exam, or at the next exercise stage.
6. The list of possible answers for each exercise or exam question is organized in a way that each incorrect answer will point to a different error in reasoning, thus making it possible for the algorithm to analyze cognitive failures.
7. When preparing a student for an exam in which the amount of time spent on each question or section is relevant, said time is being measured. The system then analyzes the reasons why each response took a particular amount of time, and reaches relevant conclusions.
8. Certain tutorials offered by the present invention allow the student to request a 'hint' to the correct answer. The system analyzes and draws conclusions from the possible reasons for requesting a hint to a specific question, and from the manner wherein the hint was used (whether or not the correct response was selected).
9. When preparing a student for pre-scheduled exams, the system takes into account the time remaining before the exam (e.g. the number of weeks left multiplied by the number of hours available for study each week). The tutorial program (type and quantity of exercises and exams) will follow the allotted time frame. At the beginning of each section, the system will readjust itself according to the time remaining before the exam.
10. The student's answers as well as the amount of time it takes him/her to answer each question, will be analyzed and shall provide a basis for constantly updating the students progress. The system defines the pace of the lessons by focusing on areas where the student has the best chances to improve (time invested relative to improvement achieved).
11. Some of the present invention tutorial packages include a system that is programmed to evaluate a student's cognitive preference toward learning (audio/visual/textual) and to adapt lessons to the preferred method.
12. The present invention learning system utilizes the computer's ability to perform a multi-level analysis of a student's progress at each stage of the tutorial.
13. Based on a students performance at each level, the system is able to determine the best way to proceed in building a course of development. The student then follows through the pages, which change dynamically as the program analyzes and adapts itself to the specialized needs of the student.

SUMMARY OF THE INVENTION

According to the present invention, an e-tutorial platform is provided, which automatically tailors course subject matter, allowing the student to study independently using a system that adapts itself to his/her individual needs over and over at every stage.

The model can be implemented within a wide variety of useful applications:

Exam preparation—Standardized tests (SAT, GRE, GMAT), licensing exams (the Bar, final accountancy exam or a driving license theory test), School and University exams (from grade school through high school and college).

Corporate training—Organizational cross-franchise employee training and certification for banks, telecom service providers, insurance companies, health service providers etc. It can also be used for employee training courses, employee screening procedures, on-the-job training, performance ratings, or refresher courses.

Open studies—Network-based open studies for individual groups—in a variety of areas, such as, investment portfolios, computer program operating instructions and leisure activities.

The platform allows users to attend contemporary classes using an all-encompassing e-learning system that provides lessons, exercises, exams and personalized feedback—all customized to the individual capabilities, learning pace, motivation, and advancement potential of each and every user relative to the time remaining before the exam. This advanced learning system is based on the present invention's unique ability to analyze an individual user's aptitude level and to use this information in order to improve his/her study methods. The system adapts learning material and exercises to individual performance at each stage. In essence, the present invention system is an optimal learning tool for remote Internet studies—a sort of personal teacher that responds to individual student performance.

BRIEF DESCRIPTION OF THE DRAWINGS

These and further features and advantages of the invention will become more clearly understood in light of the ensuing description of a few preferred embodiments thereof, given by way of example only, with reference to the accompanying drawings, wherein—

DETAILED DESCRIPTION OF THE PREFERRED EMBODIMENTS

The present invention's learning system is a self-teaching tool for its users. The system is based on two major principles:

1. The tutorial program is designed according to deep pre-evaluation of course requirements. This evaluation process defines all requirements such as knowledge, know-how, guiding principles, weaknesses and thinking processes, which are needed for preparing the student for a particular exam or job position. The system uses this assessment in order to set goals for the student and in order to identify the gap between the student's current level and the level needed to attain these goals.
2. Analyzing each individual student's skills, knowledge and weaknesses and adapting the training program to the individual needs of each user. As a result, the system provides the users with tailored programs by using different methods, according to his/her prior knowledge of the material, expertise in answering questions of various kinds, improvement pace, study methods, time available for completion of studies, advancement potential and personal motivation.

Figure 1:
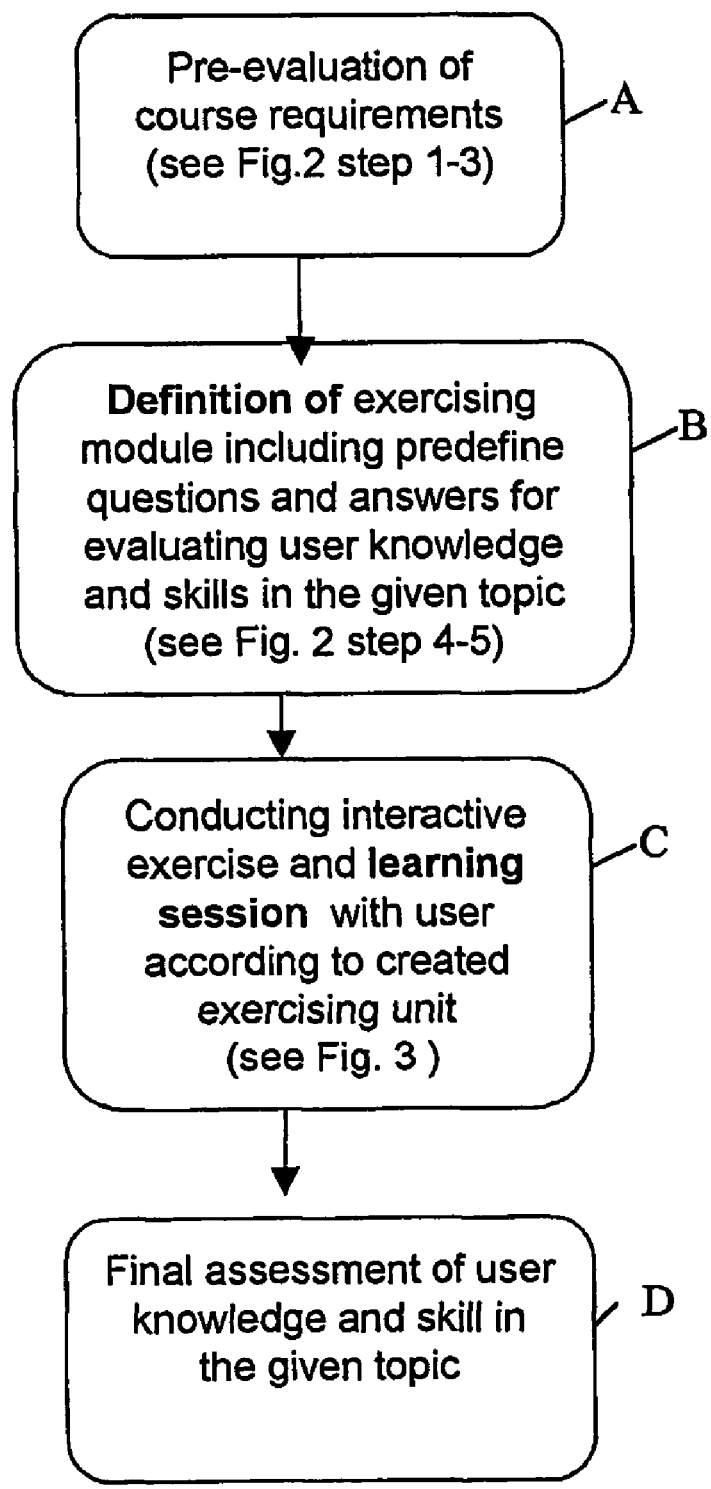
FIG. 1 is a general flow chart of the training method according the present invention.

A general flowchart of the present invention's training program preparation and training method is illustrated in FIG. 1

Figure 2:
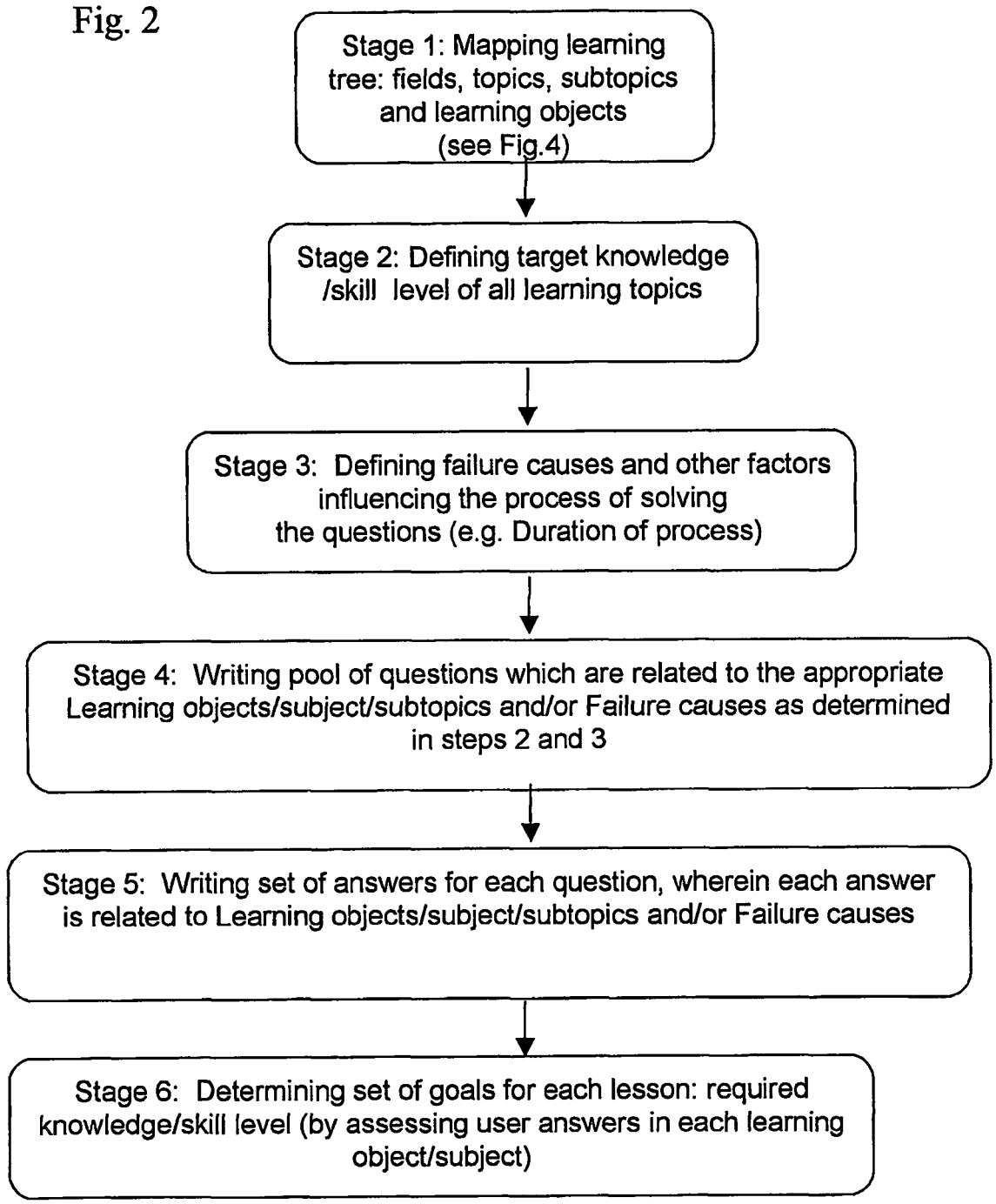
FIG. 2 is a flow-chart of creating the training program according to the present invention.
Figure 4:
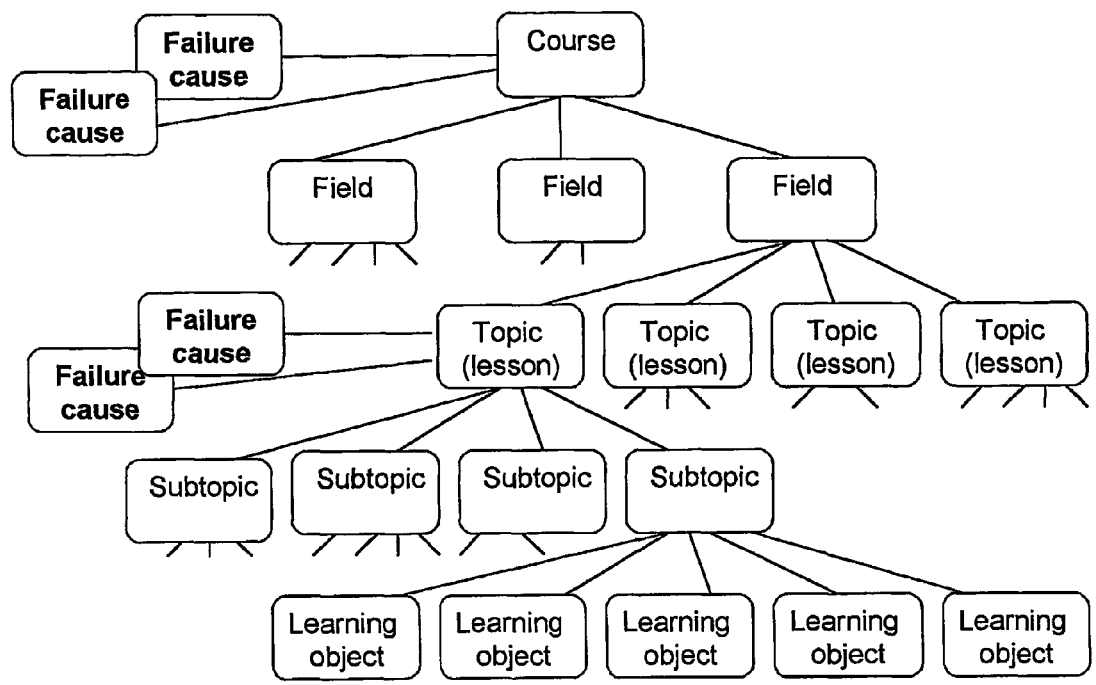
FIG. 4 is an illustration of the course structure organization according to the present invention.

The first phase of the training program preparation is a pre-evaluation process (phase A) of the course's requirements. Such a process includes (as illustrated in FIG. 2) the following stages:

Stage 1: a mapping procedure, which studies all information, know-how, guiding principles etc., required for the course, resulting in an organized structure of the course. FIG. 4 illustrates general hierarchical structure of the course;

Stage 2: defining the final required target level of knowledge and skills for the specific course.

Stage 3: defining failure causes, which represent common weak points relating to a specific subject or generally to the entire course exam.

The next phase according to the present invention is the process of defining the exercising program (phase B) for the course. The process as illustrated in FIG. 2, includes:

Stage 4: writing pool of questions, which are related to the subject/subtopics/learning object, or failure cause, which were defined in previous stages.

Stage 5: writing set of answers for each written question, wherein each answer reflects at least one failure cause relating to a subject/subtopics/learning object.

Stage 6: determining set of goals for each course level based on the final goals of the course and adapted for the specific subjects of the course current stage.

According to further improvement of the present invention, it is suggested to prepare set of hints for each question. Such hints indicate of specific failure cause relating the respective question.

In case the student requests for hints during the exercise session, the system provides him with the respective hint. If the user selected the right answer after receiving a specific hint, the system can deduce that the student has difficulties relating the respective failure cause. Such conclusion influence the system evaluation of the student current level of knowledge and skill as will be further explained down bellow.

Figure 3:
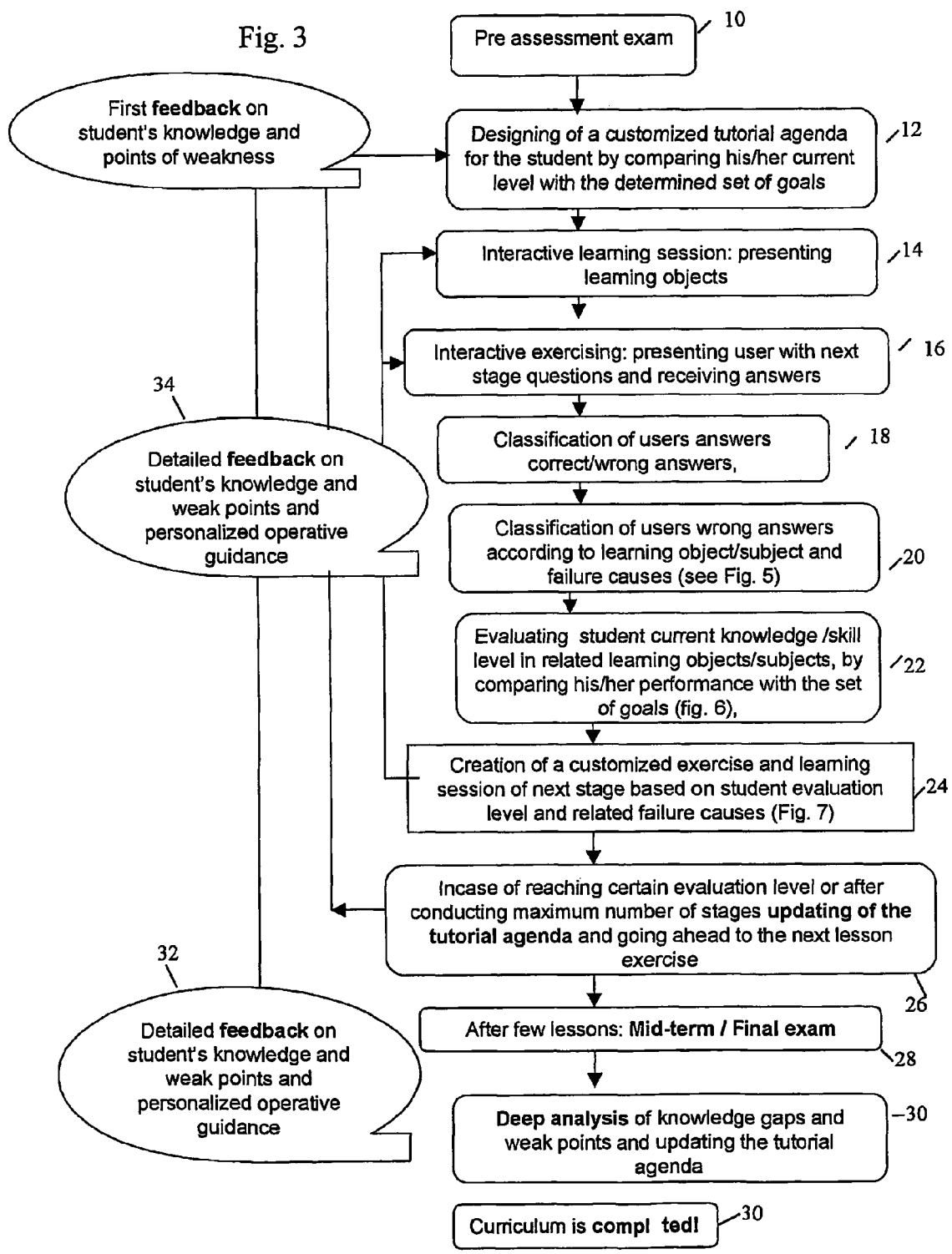
FIG. 3 is a flow-chart of conducting interactive exercise and learning session according to the present invention.

Based on the mapping of the required knowledge and expertise, an initial diagnostic test (assessment test), for testing the students aptitude strengths and weaknesses, is developed (see FIG. 3 step 10).

The system analyses the student's answers as well as the actual time spent for answering each question. This exam provides the evaluation data of student knowledge skill level in comparison with final course goals, thus it is possible to tailor an individual tutorial program for each student (see step 12 in FIG. 3).

Then, the system activates an interactive learning session, intended to provide the student with knowledge and skills in accordance with his current learning level (see step 14 in FIG. 3).

The learning session is followed by an exercising session (see FIG. 3 step 16) for training the student in the relevant subject according to the pre-evaluation status as analyzed in the assessment exam or according to evaluation status as analyzed in the previous exercising session (see step 22 in FIG. 3).

Figure 5:
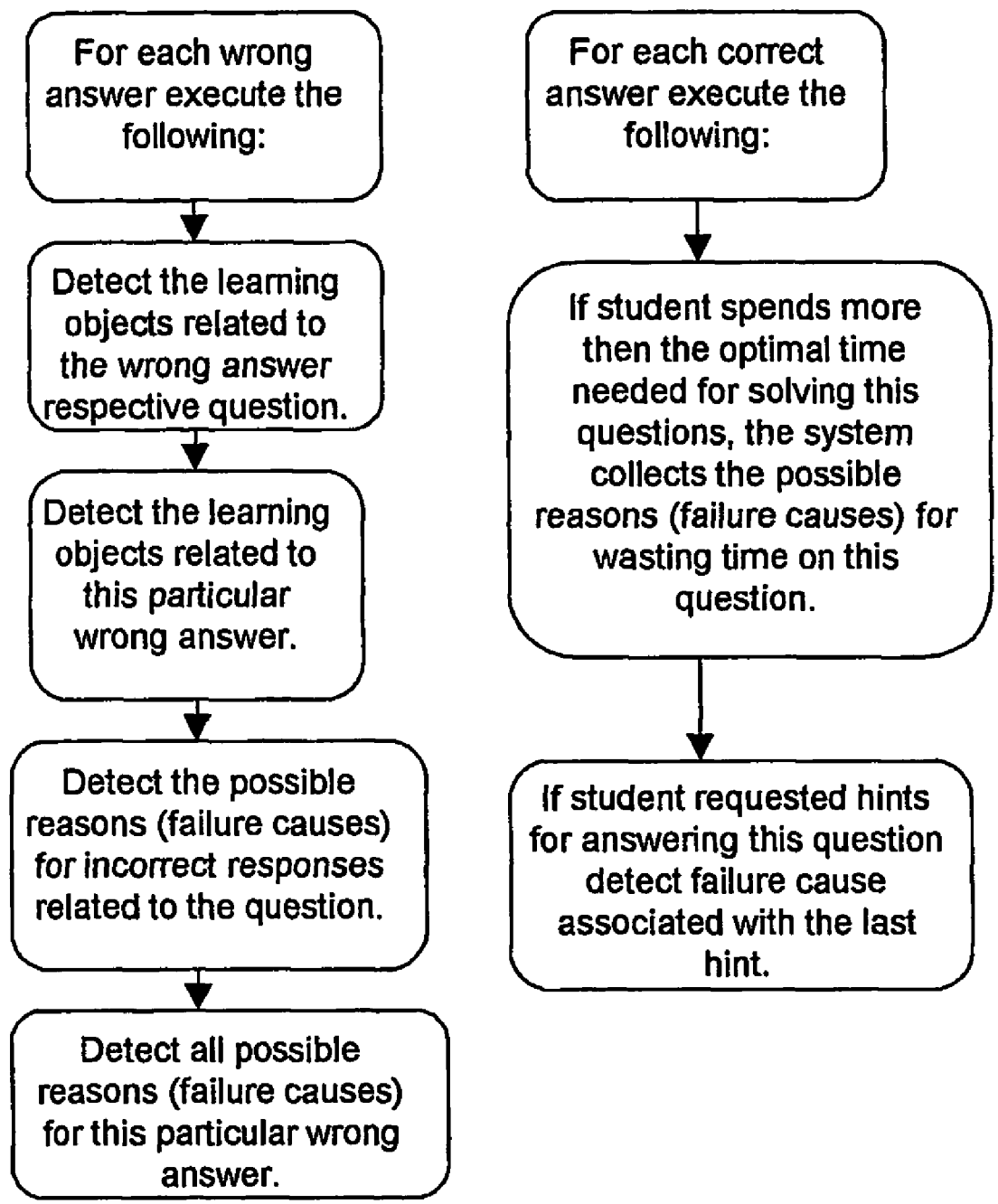
FIG. 5 is a flow-chart of classifying user's wrong answers according to the present invention.

At the end of each exercising session, the user answers are analyzed by the answer classification module 40 (see FIG. 8), for evaluating user's current level. First the answers are classified as correct/wrong (FIG. 3 step 18), at the next stage (step 20) the wrong answers are classified according to failure cause and subjects, see further details of classification process in FIG. 5

Figure 6:
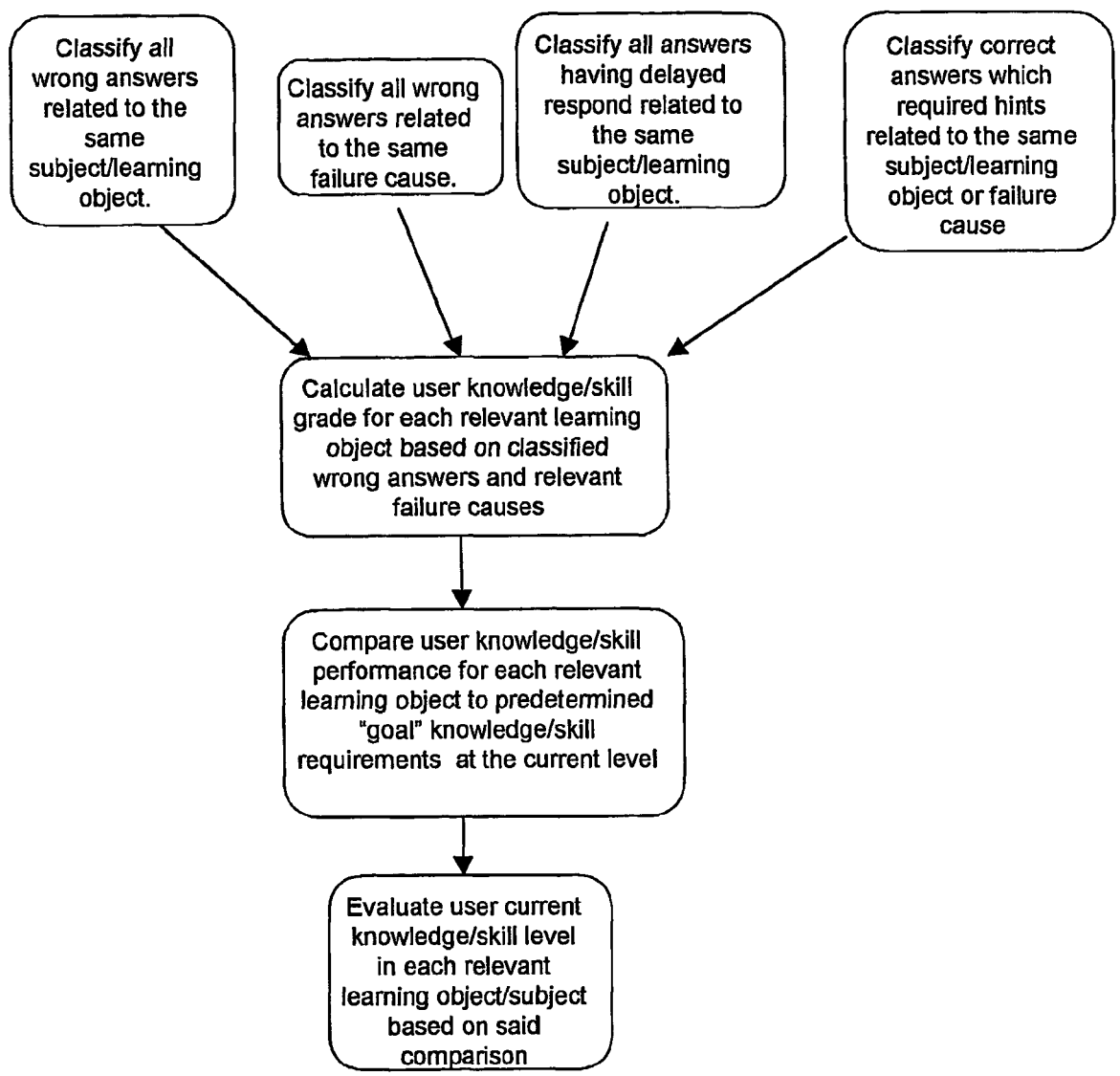
FIG. 6 is a flow-chart of evaluating student current knowledge according to the present invention.
Figure 8:
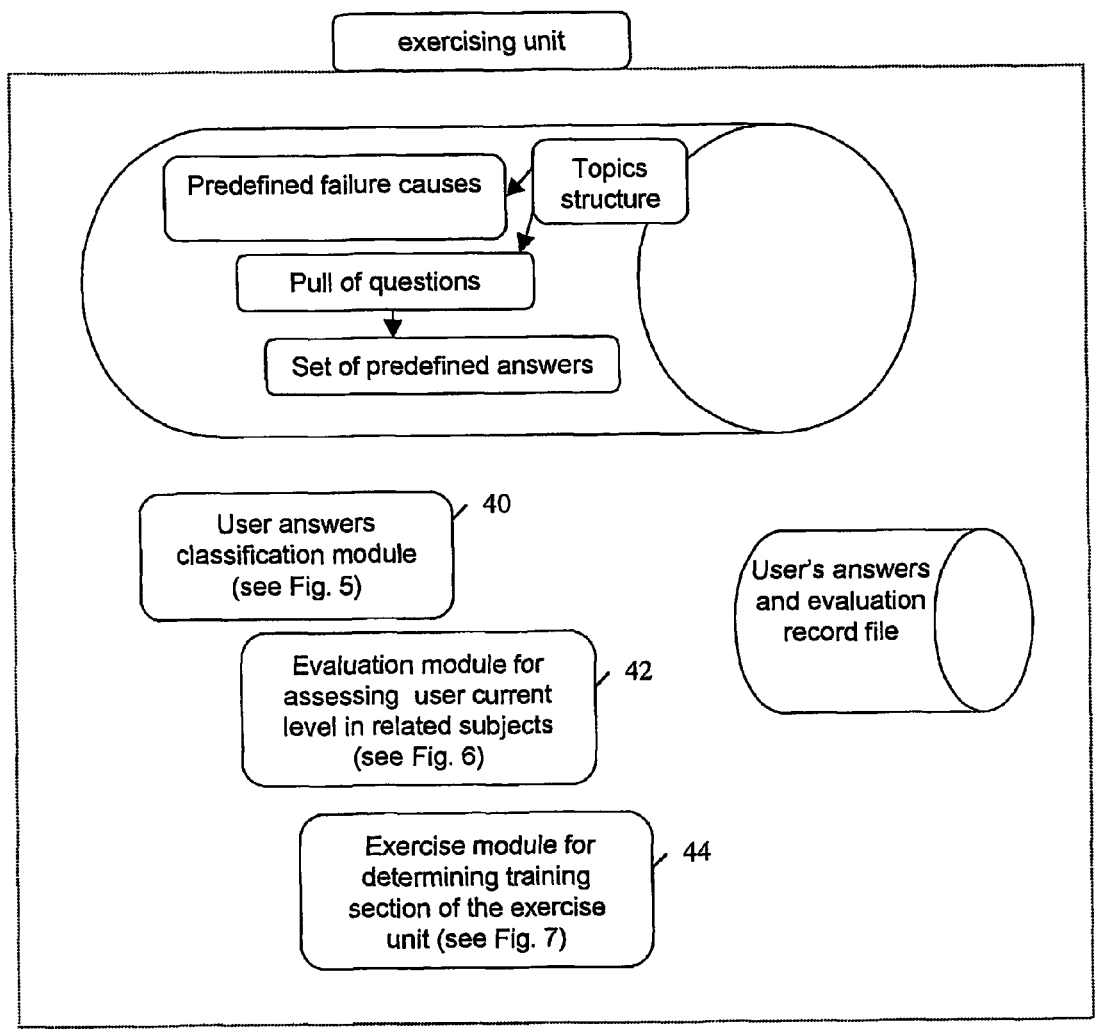
FIG. 8 is a general block diagram of the training system according the present invention.

In accordance to the answers' classification, the system evaluates student current knowledge/skill level in respective subjects, using evaluation module 42 (see FIG. 8). The evaluation process is further detailed in FIG. 6: the system detect all wrong answers related to the same subject or failure cause and calculates user grade in each subject accordingly. In case the user received hints during the excising session, the system calculates user grade in accordance with the respective failure cause of the given hint. The user performance is compared with the pre-determined target values of user's number of wrong answers in each subject of failure cause.

As a result of this analysis, the system determines an evaluation of the user in each subject of the respective course stage.

Figure 7:
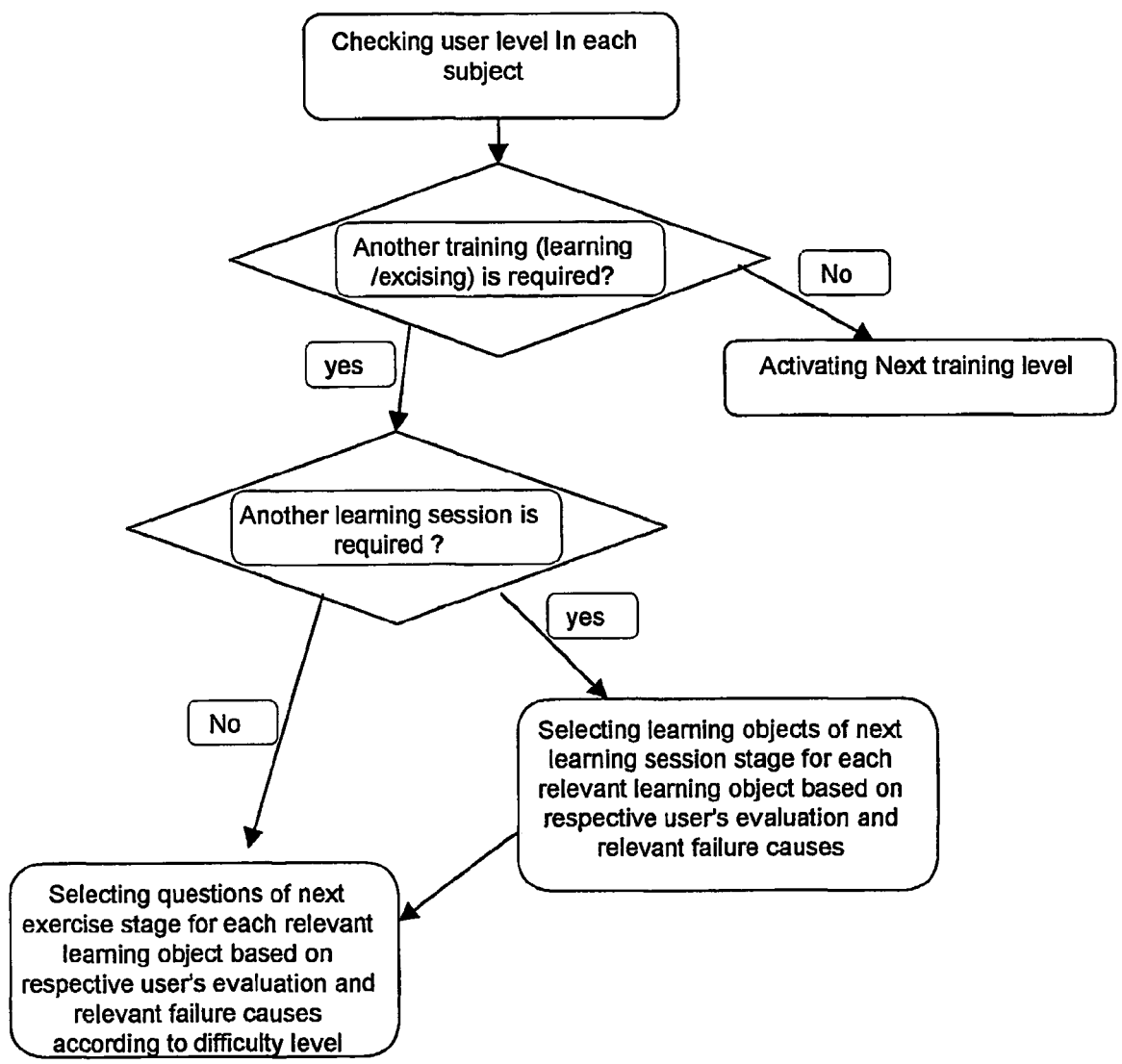
FIG. 7 is a flow-chart of creating of a customized exercise and learning session of next stage according to the present invention.

Throughout the tutorial, the system will continuously test and re-evaluate the student's progress in order to update the pace of the new material introduced and reposition the student along the learning path. Based on said evaluation, the system creates the next customized learning and exercising sessions (step 24 in FIG. 3). As seen in FIG. 7, a learning session is not required in all stages. The system examines the users current level in comparison with the knowledge/skill target level of the current course stage. If the student meets with the requirements of the current stage, the system activates the next course level learning and exercising session, otherwise the system further checks according to student current level whether another learning session is required in the relevant subject or just a further exercise session is required. The learning/exercising objects of the next session are determined in accordance to evaluation of users level in each subject and further analysis of the failure causes which were detected as problematic, as reflected in user answers or requested hints.

The user's evaluation is further used for creating a detailed feedback report for the user benefit Such a report includes information on the user's knowledge/skill weakness relating to relevant subjects and personalized guidelines. (See step 32 FIG. 3.).

The key to this program lies in the multi-level analysis of a student's weaknesses, which is subsequently integrated into an individual teaching package that will guide the student in learning how to select the correct answers. The student's answers' analysis is based not only on whether they are correct or incorrect, but also on the nature of the errors (failure cause). The assumption is that the fact that a student chose a particular wrong answer over another reflects a specific weakness in the student's knowledge of the material. In this way, the program focuses on the general weaknesses in a students knowledge and targets the specific source of this limitation.

The present invention learning program is a platform into which varying course subjects matter can be integrated. The flexible developing program engine allows different elements (i.e. homework, exercises, exams etc.) to be added or altered at any time.

Specifications

Pre-Evaluation of Course Requirements

The pre-evaluation of course requirements is performed for each exam/job position separately. It provides a complete mapping of the expected requirements from the student/employee, in order to guarantee success in course examination or job projects. The pre-evaluation phase includes the following processes:

Mapping required knowledge—mapping the knowledge and expertise required from the student/employee in order to succeed in the exam/job.

Mapping required know-how—as opposed to the required knowledge—mapping the know-how required from the student/employee in order to succeed in the exam/job.

Analyzing guiding principles—determining the guiding principles needed for succeeding in the job or in the exam.

Analyzing recurring weak points—Locating and analyzing weak points, which have effect on the job or exam success.

Analyzing the thinking process of experts in comparison to the thinking process of new students/employees—in order to characterize the desired thinking processes and determine the patterns and tips based on experts skills and experience.

Organizing knowledge and expertise subjects scale from easy to difficult—building various levels of study from the basic and simple to the difficult and complex, in order to develop the correct thinking patterns and reinforce the student confidence.

Throughout the course the student's tutorial program is continuously restructured with dynamic lessons and exercises that are updated according to his/her needs, based on the following criteria:

The students aptitude level within each subject;

The students progress & pace;

The student's chances of improvement in each subject (progress vs. investment);

Motivational considerations;

The time remaining before the exam/training is completed;

Assembling a Pool of Questions for Providing the System with Diagnostic Abilities.

The algorithm's ability to analyze and evaluate each student separately is a result of a wide variety of questions available for each subject, which is required for performing a specific job or for passing a particular test. The pool of questions is composed by a group of subject experts, and the questions are phrased in a way that enables the algorithm to diagnose a student's cognitive errors. This provides the system with the information needed to customize a learning program and further to update it through the exercise session according to the user's progress.

The student is provided with several answers to each question that tests a specific thinking process or knowledge. The student is asked to select the answer that he/she believes is most correct. The field experts, who have written the questions, have also placed several incorrect responses, in addition to the correct one. Marking any one of the incorrect responses indicates cognitive failure or a lack of understanding of a specific theory ("failure cause".(Essentially, every incorrect answer reveals a specific weakness, which most likely corresponds with the specific reasoning, which led the student to select that particular incorrect response.

To each question is attached a data file, which allows the algorithm to collect information. Moreover, each data file specifies a question's difficulty level, recommended answering time (needed incase of teaching efficient methods for problems solving, which is required for time-limited exams), topic, proficiency needed for answering quickly and correctly, possible reasons for marking each incorrect response, possible reasons for exceeding the recommended time limit etc . . .

The data collected by a student's responses is continuously aggregated and updated. The more different indicators of failure causes are exposed, the more accurately the system will be able to diagnose the students limitations and weaknesses. Throughout the e-tutorial process the student will perform exercises and will be examined on the covered material. The answers and the time needed to respond will be analyzed and shall provide a basis for constantly updating the student's progress. Based on this, the system will design a completely individual tutorial program for each student.

It is important to note that the user receives, not only a statistical analysis, but also operative recommendations on how to eliminate weaknesses and improve the specific points of weakness that were diagnosed by the system, based on the deep cognitive analysis. The present invention provides the user with a dynamic exercise program that is tailored to systematically tutor the student in those areas where lack of knowledge is most significant.

Operating Principles of the System

The basis of the system lies in a unique processing algorithm that evaluates each student's individual level, know-how, time schedule, improvement pace and cognitive preferences for each topic. Based on analysis of these critical aspects, the system builds an individual tutorial program for each student, which includes customized lessons and exercises.

The tutorial program is built and then updated based on two levels:

1. General learning program—The system evaluates the student's diagnostic test performance and the time remaining before his/her exam, against data already specified in the system, such as: minimum knowledge necessary to complete the desired course, the optimum and minimum time necessary to learn each topic (according the student's starting level), a student's chances for improvement in each subject, etc. The output is a personalized tutorial package which will specify which lessons/partial lessons the student shall study, how much time will be allotted for each lesson, the number of exercises and their level of difficulty, and the maximum possible deviation from the time schedule of a particular lesson or exercise. Throughout the learning process, with each action performed by the student, his/her level and pace will be re-evaluated.

2. Tutorial program for a specific subject—Each specific topic from within a student's general learning program includes exercises that are determined by the general learning program. After analyzing the students performance and progress, the system will determine whether he/she is ready to advance to the next exercise/learning level, or whether it is necessary to further guide, tutor or exercise the student in areas wherein the student knowledge is still lacking.

The processing algorithm is able to analyze a student's progress as a result of a wide variety of questions available for each subject. The questions are compiled by experts, based on the requirements specific to the exam (see "pre-evaluation of course requirements" above).

While the above description contains many specifities, these should not be construed as limitations on the scope of the invention, but rather as exemplifications of the preferred embodiments. Those skilled in the art will envision other possible variations that are within its scope. Accordingly, the scope of the invention should be determined not by the embodiment illustrated, but by the appended claims and their legal equivalents.

Appendix: A sample of how to carry out parts of the model

The goal of the present invention is to formulate an individual tutorial package (similar to private lessons) that is tailored to each student specifically based on his/her previous knowledge, know-how, learning pace (individual rate of progress), cognitive preferences (visual/aural), personal motivation and time constraints.

The system is based on two main principles:
1. Pre-evaluation of course requirements.
2. Identification of individual user needs for providing a 'tailor-made' tutorial program.

This document provides a general demonstration of some of the aspects of each of these principles, by using an Israeli Driving Theory exam as an example.

It is important to note that this is merely an example, and that the same model can be implemented, in a similar but more complex way, on standardized tests (SAT, GRE, GMAT), licensing exams (the Bar, final accountancy exam), school and university exams (from grade school through high school and college). As such, the system can also be used for organizational cross-franchise employee training and certification for banks, telecom service providers, insurance companies, health service providers etc.

1. Sample: Pre-evaluation of "Driving Theory" course requirements

This sample of course pre-evaluation will refer only to the sub-topic of 'traffic signs.' The standard method for learning the various traffic signs is to memorize them according to a table that includes pictures of over 100 traffic signs, which are presented in a seemingly random fashion.

On the other hand, through the pre-evaluation process it becomes apparent that there is logic behind the composition of most traffic signs:

a. Traffic signs can be grouped and labeled according shape ('caution signs' = red triangle, 'regulatory signs' = circle, 'guide signs' = square, 'road markings' and traffic lights).
 b. Each of these groups can be sub-categorized according to additional common traits. Within the 'regulatory sign' group a sub-group of 'restriction signs' (red circle) and sub-group of 'directional signs' (blue circle) can be distinguished. The 'restriction signs' can be even further separated into sub-types of 'no entry' signs, 'no parking' signs or restriction of other specified actions.

In order to correctly identify a traffic sign, the student should:

1. Recognize the different traffic sign categories and their basic characteristics – guiding principles.
 2. Recognize the symbol shown on each sign. These symbols cab be separated into two groups: Simple/trivial symbols (a bicycle, a horse, a bend in the road), and symbols which require learning and interpretation (a stripe, an exclamation mark).
 3. Be able to integrate the category and guiding principle. A red circle, meaning 'restricted' integrated with the symbol for a horse has a combined meaning of 'no entry for animal drawn carriages or animals not on a leash.'

The exercise and exam questions will be written in such a way that the system algorithm will be able analyze the essence of a student's incorrect responses. The system will test whether:

a. The student has mastered the guiding principle of the main traffic sign categories (caution, regulatory, etc)

b. The student has mastered the guiding principle of the sub-categories (restriction, directional etc.)

c. The student understands the meaning of a symbol (bridge, two parallel vehicles etc).

d. The student is able to successfully integrate the meanings of the symbol with the shape of the sign (a man in a triangle symbolizes an approaching crosswalk, as opposed to a man in a circle which symbolizes no entrance for pedestrians).

Following is an example of how questions are formulated based on this evaluation.

2. Sample: Identifying individual user needs for providing a 'tailor-made' tutorial program

Exam question:

a. Which of the following traffic signs signifies 'no entry for pedestrians'?
   (1)   Traffic sign # 24
   (2)   Traffic sign # 28
   (3)   Traffic sign # 43
   (4)   Traffic sign # 78

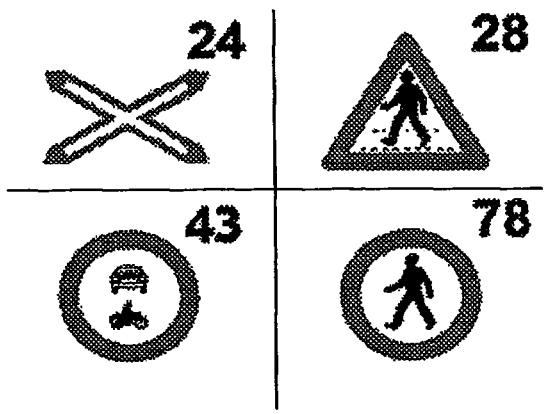

| The explanation provided to the student: |
|---|
| The correct response is: (4)<br>Only a round sign can denote 'no entry.' The sign shows an image of person, and therefore, corresponds to 'no entry for pedestrians.'<br>By using the language of signs, it is possible to rule out the first two responses, which are warning signs. Answer (3), traffic sign 43, represents no entry for vehicles rather than people – and therefore, is ruled out based on the image.<br><br>Take Note!!<br>It is important to understand the language of the traffic signs, based on which is it possible to interpret almost any sign. |

| The following hint will be provided upon request: |
|---|
| Which of the following traffic signs signifies some type of restriction? |

System data collection:
In order to gather the maximum amount of information regarding a student's level for each parameter required for performing well on the exam, the author of the exam questions determines what conclusions can be reached when a student chooses a particular incorrect response.

Such, for example, with the previous question:

Question code: Areas of 'no entry'
Traffic signs
Regulatory signs

Possible reasons for selecting answer 1:
Knowledge: caution signs
The student was unable to identify a sign that could *not* be interpreted according to the guiding principles (this traffic sign is an exception, and knowledge of it requires memorization)

Possible reasons for selecting answer 2:
Knowledge: caution signs
The student was unable to identify a sign that could be interpreted according to the guiding principles of traffic sign categories (red triangle = caution and not regulatory).

Possible reasons for selecting answer 3:
Knowledge: Regulatory signs
The student was unable to identify a sign that could be interpreted according to the guiding principles of traffic sign symbols.

Building a tailor-made solution – Individual tutorial program
The system gathers data based on the student's answers to a number of questions, and analyzes this data with respect to the pre-evaluation of required knowledge. Based on this, the system will mold a completely individual tutorial program for the specific topic.
   a. If the system recognizes that the student consistently lacks the ability to make interpretations based on the guiding principles of the categories, he/she will be redirected to basic lessons on those principles.
   b. If the system recognized that the student consistently lacks the ability to make interpretations based on the guiding principles of traffic symbols, he/she will be redirected to basic lessons on those principles.
   c. If the student does not recognize a traffic sign that is an exception to the guiding principles, the specific sign will be re-taught (there are only a limited number of signs which do not follow the guiding principles).

d. If the system recognizes that the student consistently makes errors that relate to a specific sub-category, he/she will be redirected to lessons referring to the sub-category (i.e. restriction signs).

Once the student has completed the lessons on a specific topic, he/she will be given exercises on the topic.

This document has served to provide a specific sample for how the system identifies the gap between course requirements and actual abilities, and how an individual learning program is tailored for each student. Some of the tools for analysis presented in the previous document are highlighted here. This method, along with the additional methods for pre-evaluating course requirements, diagnosing user needs and customizing learning programs are utilized in building the entire course.

What is claimed is:

1. A computer based method of training a user in a given subject comprising:
   providing the user through a computer interface a set of questions on the given subject, wherein the questions and their associated answers are predefined and stored in a database;
   evaluating wrong answers the user provided to the questions;
   correlating sets of wrong answers to the predefined questions in order to determine a Failure Cause, wherein a specific wrong answer is associated with a specific Failure Cause, which Failure Cause is selected from a list of possible Failure Causes;
   if misunderstanding or misapplication of a principle or concept within the given subject is determined to be the Failure Cause, providing the user with a computer based lesson focused on the misunderstood or misapplied principle or concept.

2. The method according to claim 1, wherein providing a computer based lesson focused on the misunderstood or misapplied principle or concept includes providing a computerized tutorial on the misunderstood or misapplied principle or concept.

3. The method according to claim 1, wherein providing a computer based lesson focused on the misunderstood or misapplied principle or concept includes providing a set of questions focused on the misunderstood or misapplied principle or concept.

4. The method according to claim 3, further comprising evaluating answers the user provides to the set of questions focused on the misunderstood or misapplied principle or concept.

5. A computer based system for training a user in a given subject comprising:
   a digital memory;
   a human interface; and
   a computing unit adapted to evaluate wrong answers the user provided to a set of questions which were stored in a database and presented to the user through the human interface, said computing unit further adapted to correlate sets of wrong answers to the questions in order to determine a Failure Cause, wherein a specific wrong answer is associated with a specific Failure Cause selected from a list of possible Failure Causes, and if misunderstanding or misapplication of a principle or concept within the given subject is determined to be the Failure Cause, to provide the user with a computer based lesson focused on the misunderstood or misapplied principle or concept.

6. The system according to claim 5, wherein the computing unit is adapted to provide a lesson focused on the misunderstood or misapplied principle or concept by providing a computerized tutorial focused on the misunderstood or misapplied principle or concept.

7. The system according to claim 5, wherein the computing unit is adapted to provide a lesson focused on the misunderstood or misapplied principle or concept by providing a set of questions focused on the misunderstood or misapplied principles or concept.

8. The method according to claim 7, wherein the computing unit is further adapted to evaluate answers the user provides to the set of questions focused on the misunderstood or misapplied principle or concept.

* * * * *